(12) United States Patent
Kudo

(10) Patent No.: US 9,578,250 B2
(45) Date of Patent: Feb. 21, 2017

(54) DISPLAY CONTROL APPARATUS

(71) Applicant: OLYMPUS CORPORATION, Hachioji-shi, Tokyo (JP)

(72) Inventor: Yasunori Kudo, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/972,374

(22) Filed: Dec. 17, 2015

(65) Prior Publication Data

US 2016/0105614 A1 Apr. 14, 2016

Related U.S. Application Data

(63) Continuation of application No. PCT/JP2014/065352, filed on Jun. 10, 2014.

(30) Foreign Application Priority Data

Sep. 9, 2013 (JP) .................................. 2013-186774

(51) Int. Cl.
*H04N 5/232* (2006.01)
*H04N 5/243* (2006.01)
(Continued)

(52) U.S. Cl.
CPC ......... *H04N 5/23293* (2013.01); *G03B 13/02* (2013.01); *G03B 17/20* (2013.01);
(Continued)

(58) Field of Classification Search
CPC ....... G09G 2320/0646; G09G 2320/16; G09G 2320/0626; G09G 2320/0653;
(Continued)

(56) References Cited

U.S. PATENT DOCUMENTS 7,683,964 B2* 3/2010 Okuno ................. H04N 5/2351
348/362
8,203,515 B2* 6/2012 Mori .................... G09G 3/3406
345/102
(Continued)

FOREIGN PATENT DOCUMENTS

JP 2002300447 A 10/2002
JP 2003153073 A 5/2003
(Continued)

OTHER PUBLICATIONS

International Search Report mailed in corresponding International Patent Application No. PCT/JP2014/065352 on Sep. 9, 2014, consisting of 5 pp. (English translation provided).

Primary Examiner — Michael Osinski
(74) Attorney, Agent, or Firm — Volpe and Koenig, P.C.

(57) ABSTRACT

A display control apparatus includes: a stability brightness calculation unit for calculating a stability brightness obtained by modifying a temporal change in a brightness of a subject to a slower temporal change on the basis of a change in the brightness of the subject detected by a brightness detection unit; and a display brightness control unit for controlling a following speed of the change in the brightness of a display image with respect to a change in the brightness of the subject on the basis of the calculated stability brightness so that an amount of a change in the brightness related to the display image can become longer than the amount of the change in the brightness of the subject.

7 Claims, 15 Drawing Sheets

(51) Int. Cl.
   *G03B 13/02* (2006.01)
   *G03B 17/20* (2006.01)
   *H04N 5/235* (2006.01)
   *H04N 101/00* (2006.01)

(52) U.S. Cl.
   CPC ............ *H04N 5/235* (2013.01); *H04N 5/243* (2013.01); *G09G 2320/0653* (2013.01); *H04N 2101/00* (2013.01)

(58) Field of Classification Search
   CPC ..... G09G 2320/0271; G09G 2320/064; G09G 2320/062; H04N 5/235; H04N 5/23258; H04N 5/23293; H04N 5/2351
   See application file for complete search history.

(56) References Cited

U.S. PATENT DOCUMENTS

| | | | | | |
|---|---|---|---|---|---|
| 8,237,753 | B2 * | 8/2012 | Murai | ................. | G09G 3/3406 345/690 |
| 8,525,934 | B2 * | 9/2013 | Okui | .................... | G09G 3/20 348/687 |
| 8,749,473 | B2 * | 6/2014 | Oda | ................... | G09G 3/3426 345/102 |
| 8,872,957 | B2 * | 10/2014 | Jogetsu | ................ | G03B 13/04 348/333.01 |
| 9,019,389 | B2 * | 4/2015 | Osawa | ................... | H04N 5/262 348/208.12 |
| 2004/0119877 | A1 * | 6/2004 | Shinozaki | ............ | H04N 5/235 348/362 |
| 2008/0036872 | A1 * | 2/2008 | Nobori | ..................... | G06T 5/40 348/222.1 |
| 2008/0117160 | A1 | 5/2008 | Oka et al. | | |
| 2008/0309517 | A1 * | 12/2008 | Saito | ....................... | B60R 1/00 340/937 |
| 2009/0231464 | A1 * | 9/2009 | Nakamura | ............ | H04N 5/217 348/229.1 |
| 2010/0171858 | A1 | 7/2010 | Osawa | | |
| 2011/0200318 | A1 * | 8/2011 | Ichikawa | .............. | G09G 3/3406 396/296 |
| 2014/0055505 | A1 * | 2/2014 | Ikeda | ...................... | G09G 3/22 345/690 |
| 2014/0063330 | A1 * | 3/2014 | Matsuyama | ......... | H04N 5/2353 348/352 |
| 2015/0268810 | A1 * | 9/2015 | Hoshino | ................. | G09G 5/00 345/589 |

FOREIGN PATENT DOCUMENTS

| | | |
|---|---|---|
| JP | 2006025012 A | 1/2006 |
| JP | 2006317815 A | 11/2006 |
| JP | 2008129251 A | 6/2008 |
| JP | 2010068046 A | 3/2010 |
| JP | 2010160272 A | 7/2010 |

* cited by examiner

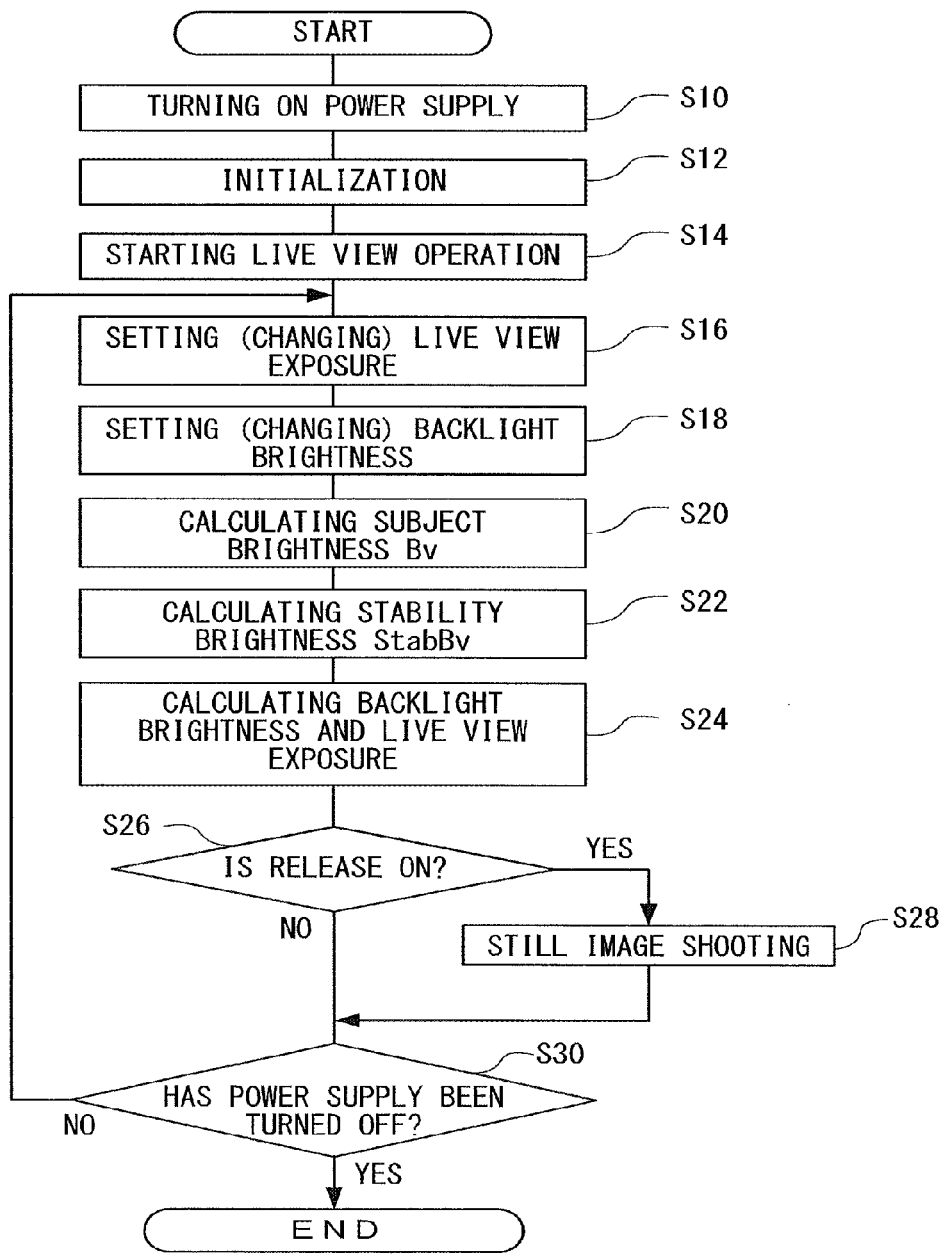
F I G. 3

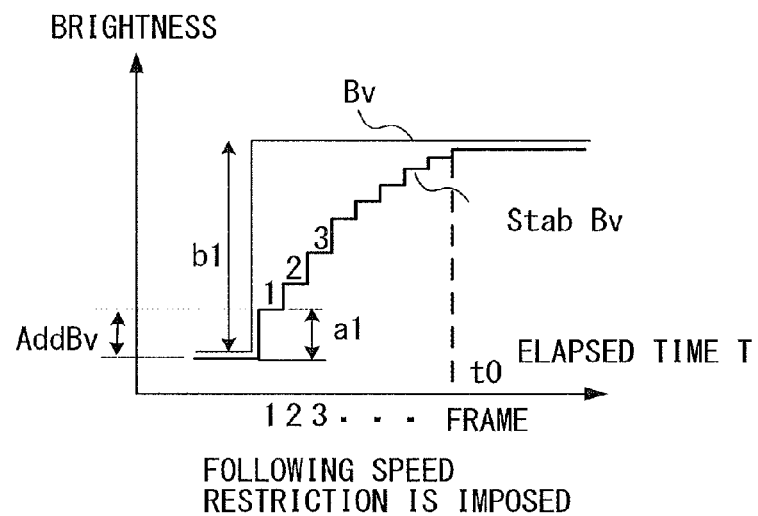
F I G. 6A

BACKLIGHT SPEED RESTRICTION IMPOSED

SUBJECT BRIGHTNESS Bv

ELAPSED TIME T

STABILITY BRIGHTNESS Stab Bv

ELAPSED TIME T

BACKLIGHT BRIGHTNESS

ELAPSED TIME T

CAPTURED IMAGE OUTPUT

ELAPSED TIME T

MERGING CAPTURED IMAGE OUTPUT AND BACKLIGHT BRIGHTNESS

ELAPSED TIME T

BACKLIGHT SPEED RESTRICTION IMPOSED

SUBJECT BRIGHTNESS

STABILITY BRIGHTNESS

BACKLIGHT BRIGHTNESS

CAPTURED IMAGE OUTPUT

MERGING CAPTURED IMAGE OUTPUT AND BACKLIGHT BRIGHTNESS

BACKLIGHT SPEED RESTRICTION NOT IMPOSED
FIG. 10A
SUBJECT BRIGHTNESS Bv
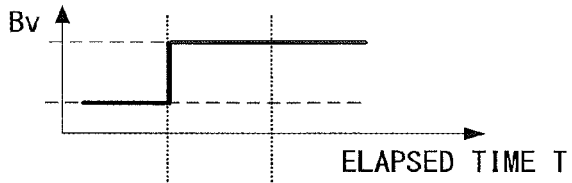
ELAPSED TIME T
FIG. 10B
STABILITY BRIGHTNESS Stab Bv
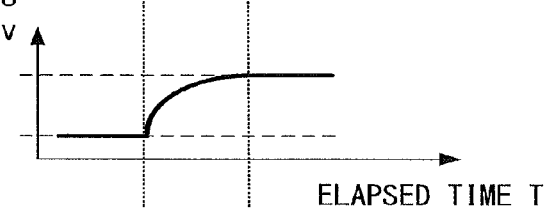
ELAPSED TIME T
FIG. 10C
BACKLIGHT BRIGHTNESS
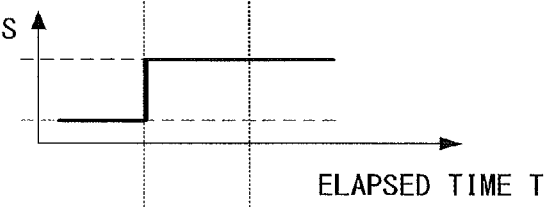
ELAPSED TIME T
FIG. 10D
CAPTURED IMAGE OUTPUT
255
118
0
ELAPSED TIME T
FIG. 10E
MERGING CAPTURED IMAGE OUTPUT AND BACKLIGHT BRIGHTNESS
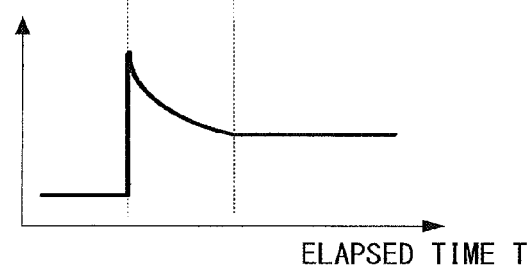
ELAPSED TIME T

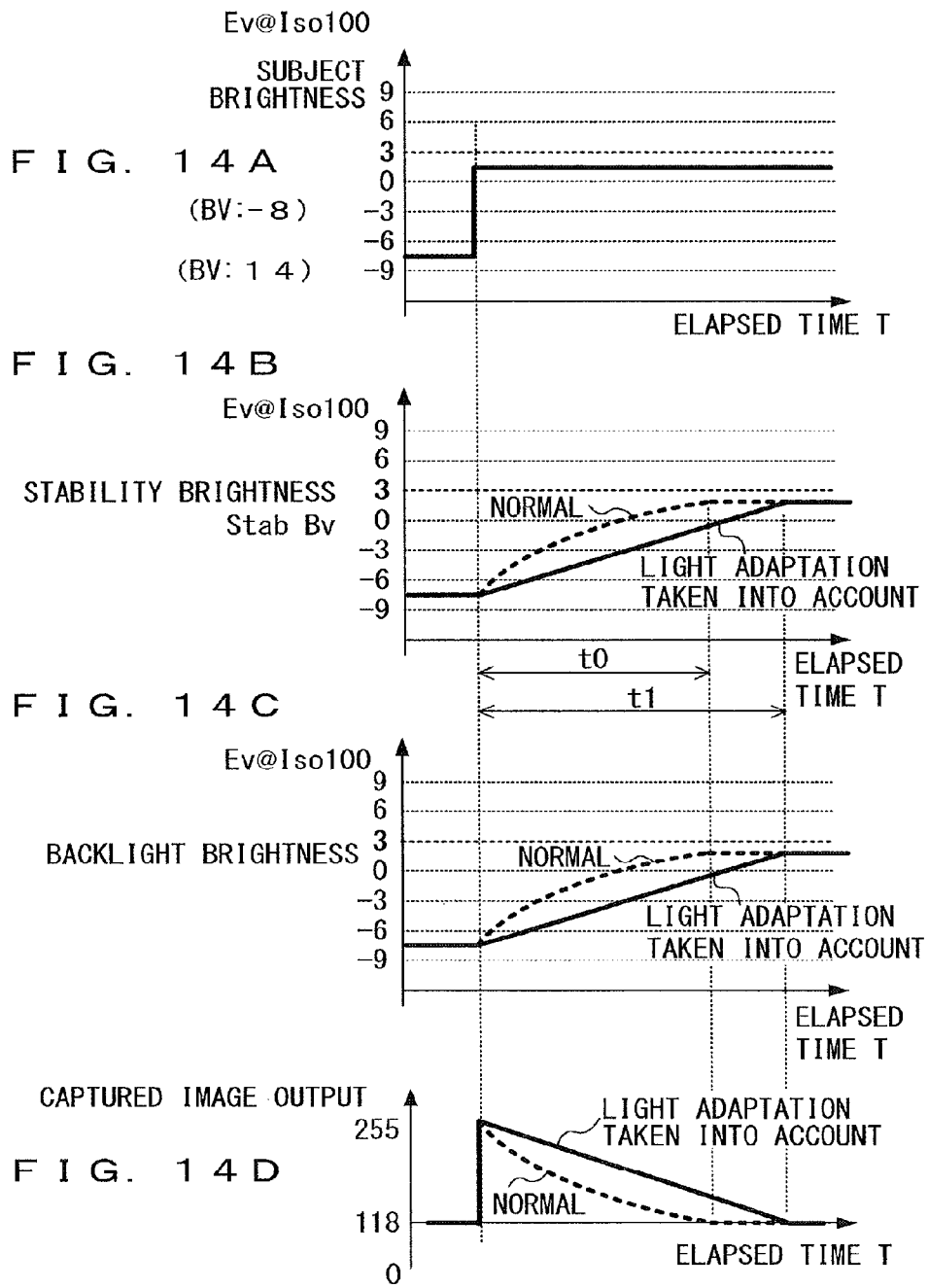

DISPLAY CONTROL APPARATUS

CROSS-REFERENCE TO RELATED APPLICATION

This application is based upon and claims the benefit of priority of the prior Japanese Patent Application No. 2013-186774, filed on Sep. 9, 2013, the entire contents of which are incorporated herein by reference.

This is a Continuation Application of PCT Application No. PCT/JP2014/065352, filed on Jun. 10, 2014, which was not published under PCT Article 21(2) in English.

BACKGROUND OF THE INVENTION

Field of the Invention

The present invention relates to a display control apparatus that controls a display device of an image capturing device.

Description of the Related Art

A digital camera is provided with a display device in order to verify a subject at the time of shooting, or a content of a shot image. As a display device, a liquid crystal display device (LCD) having a backlight is generally mounted. There are many types of display devices in which the brightness of a backlight can be manually adjusted. There is also a camera in which the brightness of a backlight is increased so that content of a display can be easily viewed in a bright place (outdoors), or decreased to save energy in a dark place.

Additionally, for a solitary display device such as a so-called liquid crystal TV, various types of methods for automatically adjusting the brightness of a backlight in accordance with the brightness or the state of a screen have been proposed. For example, a device in which the brightness of a backlight is adjusted not merely on the basis of average brightness of a screen but in accordance with on-screen brightness or a color histogram distribution has been proposed (for example, Japanese Laid-open Patent Publication No. 2008-129251).

SUMMARY OF THE INVENTION

An object of the present invention is to provide a display control apparatus that controls brightness of a backlight in order to prevent the visibility of a subject from being impaired.

To achieve the above described object, a display control apparatus that controls a display image displayed on a display device, provided in an image capturing device, for visually identifying a subject includes: an input unit to which an output of a captured image obtained by shooting is input; a brightness detection unit for detecting a brightness of a shot subject on the basis of an input of the output of the captured image; a stability brightness calculation unit for calculating a stability brightness obtained by modifying a temporal change in the brightness of the subject to a slower temporal change on the basis of a change in the brightness of the subject detected by the brightness detection unit; and a display brightness control unit for controlling a following speed of a change in the brightness of the display image with respect to the change in the brightness of the subject on the basis of the calculated stability brightness so that an amount of time of the change in the brightness related to the display image can become longer than an amount of time of the change in the brightness of the subject. The display brightness control unit defines, as a brightness adjustment value, the amount of the change in the stability brightness until the stability brightness catches up with the change in the brightness of the subject, and performs a control such that the stability brightness catches up with the change in the brightness of the subject while decreasing the brightness adjustment value.

BRIEF DESCRIPTION OF THE DRAWINGS

FIG. 3 is a flowchart for explaining a process for controlling backlight brightness with respect to a change in subject brightness.

FIG. 6A represents an example of a state where stability brightness StabBv follows a change in subject brightness Bv.

FIG. 10A illustrates a change in the backlight brightness and the like when a speed restriction is not imposed on the backlight brightness.

FIG. 10B illustrates a change in the backlight brightness and the like when a speed restriction is not imposed on the backlight brightness.

FIG. 10C illustrates a change in the backlight brightness and the like when a speed restriction is not imposed on the backlight brightness.

FIG. 10D illustrates a change in the backlight brightness and the like when a speed restriction is not imposed on the backlight brightness.

FIG. 10E illustrates a change in the backlight brightness and the like when a speed restriction is not imposed on the backlight brightness.

FIG. 14A illustrates a change in the backlight brightness and the like with respect to a change in the subject brightness at the time of low-brightness shooting.

FIG. 14B illustrates a change in the backlight brightness and the like with respect to a change in the subject brightness at the time of low-brightness shooting.

FIG. 14C illustrates a change in the backlight brightness and the like with respect to a change in the subject brightness at the time of low-brightness shooting.

FIG. 14D illustrates a change in the backlight brightness and the like with respect to a change in the subject brightness at the time of low-brightness shooting.

DETAILED DESCRIPTION OF THE PREFERRED EMBODIMENTS

Figure 1:
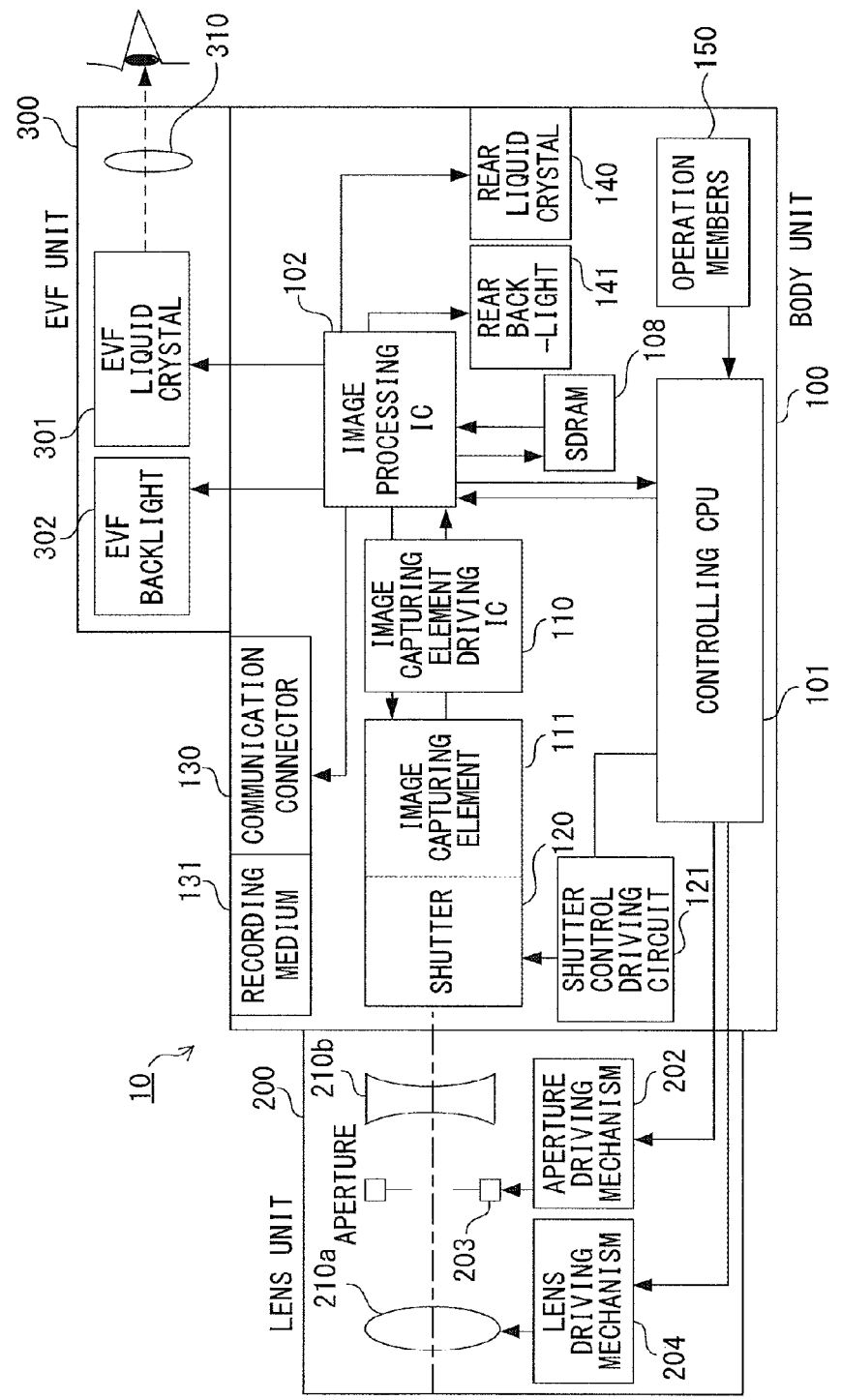
FIG. 1 is a block diagram illustrating a principal configuration of the entire digital camera.

An embodiment according to the present invention is described below with reference to the drawings. The embodiment according to the present invention is described by taking, as an example, a case where a display control apparatus according to the present invention is mounted in a digital camera 10, which is an image capturing device. FIG. 1 is a block diagram illustrating a principal configuration of the entire digital camera 10. This embodiment is described by taking, as an example, a single-lens digital camera 10 of a lens interchangeable type. This embodiment is similarly implemented also in a case of a digital camera of a built-in lens type. This embodiment may be also applied to a moving image capturing device, and a cellular phone or a portable terminal.

The digital camera 10 is mainly composed of a body unit 100, a lens unit 200 and an EVF unit 300. The body unit 100 has a lens mount (not illustrated) to and from which the lens unit 200 is interchangeably attached and detached. The body unit 100 is a main body of the digital camera 10 including an image capturing element, a major processing circuit or an operation unit or the like.

As the lens unit 200, a plurality of types of lens units are prepared in accordance with an optical characteristic. The lens unit 200 is a lens attachable and detachable to and from the body unit 100. The EVF (Electronic View Finder) unit 300 is a display device that incorporates a liquid crystal display device and is arranged on the top or the like of the body unit 100.

The body unit 100 incorporates a controlling CPU 101, an image processing IC 102, an SDRAM 108, an image capturing element driving IC 110, an image capturing element 111, a mechanical shutter 120, a shutter control driving circuit 121, a communication connector 130, a recording medium 131, a rear backlight 141, rear liquid crystal 140, operation members 150 and the like.

The controlling CPU 101 is a control unit that reads a control program stored on an internal recording medium, and controls the entire digital camera 10 in accordance with the read control program. The image processing IC 102 is an image processing unit that executes various types of image processes such as a white balance process, a γ process, and the like for the brightness, the color and the like of a shot image. Moreover, the image processing IC 102 generates and outputs a live view image displayed on a display device in live view mode. Details of the image processes in the live view mode will be described later.

The SDRAM 108 is a working memory in which a digitized shot image is stored, and with which the image processing IC 102 executes the image processes. The image capturing element driving IC 110 controls the driving of the image capturing element 111, amplifies an image signal output from the image capturing element 111, and executes processes such as A/D and the like. In the live view mode, the image capturing element driving IC 110 controls the image capturing element 111 with an exposure time specified by an element shutter operation. The image capturing element 111 is an opto-electric conversion element, and is composed of a CCD or a CMOS.

The mechanical shutter 120 mechanically adjusts the exposure time of the image capturing element 111 by opening and closing a shroud with the driving of a motor. The mechanical shutter 120 is opened or closed at the time of actual shooting, and is kept open in the live view mode. The shutter control driving circuit 121 drives the motor of the mechanical shutter 120, and controls the opening and the closing of the shutter, and time periods of the opening and the closing by driving the motor of the mechanical shutter 120.

The communication connector 130 is a connector of a USB (Universal Serious Bus) type or an HDMI (High-Definition Multimedia Interface: registered trademark) type. To the communication connector 130, a cable for transmitting and receiving data between the digital camera 10 and an external device (a memory, a printer or the like) connected to the digital camera 10 is connected. The recording medium 131 is a recording unit for recording a shot image, and is insertable and removable into and from the body unit 100.

The rear liquid crystal 140 is arranged at the rear of the body unit 100 so that it can be exposed to an outside. On the rear liquid crystal 140, a live view image, a shot image, or a camera menu for setting shooting conditions are displayed by opening and closing a liquid crystal shutter. The rear backlight 14 is arranged on the back or the side of the rear liquid crystal 140, and functions as a light source of a liquid crystal. The rear backlight 141 is composed of a fluorescent tube or LED. The operation members 150 are buttons with which a photographer inputs an operation instruction. The operation members 150 include a power supply switch and a release switch.

The lens unit 200 includes an aperture driving mechanism 202, an aperture 203, a lens driving mechanism 204, and a lens 210a (210b). The aperture 203 adjusts an incident aperture diameter of subject light by opening and closing a blade with the driving of an actuator not illustrated. The aperture driving mechanism 202 adjusts the aperture 203 to a specified aperture diameter by driving the actuator of the aperture 203. The lens 210a (210b) is composed of a plurality of lenses arranged at specified intervals, and forms an image of the subject light onto the image capturing element 111. The lens driving mechanism 204 has a motor for moving the lens 210a (210b) in an optical axis direction, and adjusts a focal position and a focal distance.

The EVF unit 300 includes EVF liquid crystal 301, an EVF backlight 302, and an eyepiece lens 310. The EVF unit 300 is a near-eye image display device, and is mainly used to shoot an image rather than to replay an image. The EVF liquid crystal 301 displays a live view image, a shot image or the like by opening and closing a liquid crystal shutter. The EVF backlight 302 is arranged on the back or the side of the EVF liquid crystal 301, functions as a light source of the liquid crystal, and is composed of a fluorescent tube or LED. The eyepiece lens 310 is a lens that enlarges an image displayed on the EVF liquid crystal 301 in accordance with a photographer.

Operations of the above described digital camera 10 are briefly described. The controlling CPU 101 controls the image processing IC 102, the shutter control driving circuit 121, the aperture driving mechanism 202, the lens driving mechanism 204 and the like. When the controlling CPU 101 is notified of an input from the operation member 150, the controlling CPU 101 respectively controls the units in accordance with an instruction, input to the operation member 150, of a photographer.

Subject light is formed on the image capturing element 111 by the lens 210a (210b), and an image signal that is opto-electrically converted by the image capturing element 111 is converted into a digital captured image output by the image capturing element driving IC 110, and is input to the image processing IC 102. In the live view mode, the image processing IC 102 generates a display image from the input of the captured image output (captured image data), and outputs the image to the rear liquid crystal 140 and the EVF liquid crystal 301. Moreover, the image processing IC 102 controls the rear backlight 141 and the EVF backlight 302. A display destination of a live view image is decided in accordance with a selection of a photographer. The live view image may be displayed on either or both of the rear liquid crystal 140 and the EVF liquid crystal 301.

Figure 2:
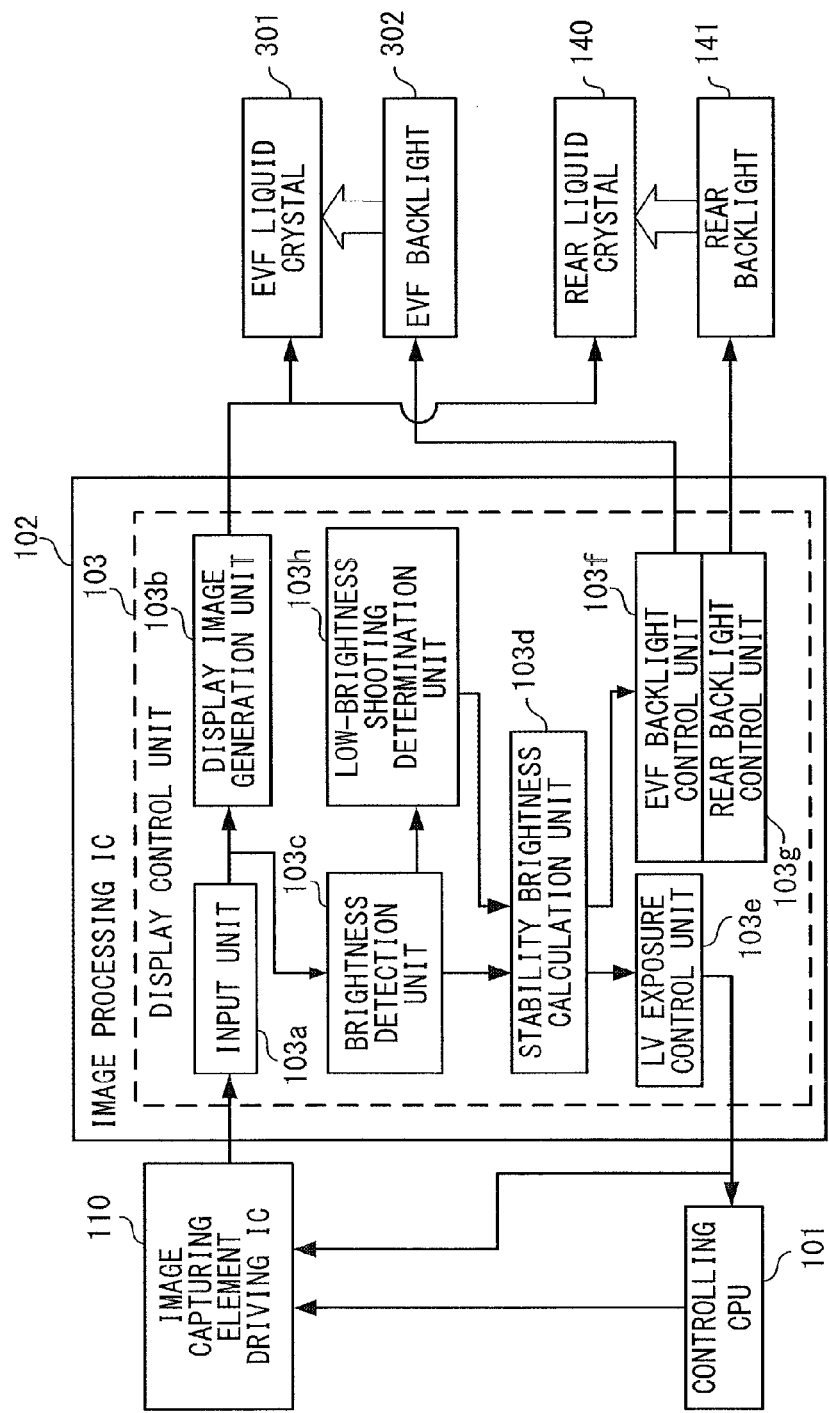
FIG. 2 is a block diagram for explaining a process related to a display control of an image processing IC.

FIG. 2 is a block diagram for explaining a process related to a display control of the image processing IC 102. The image processing IC 102 includes a display control unit 103 for displaying a live view image on the rear liquid crystal 140 and the EVF unit 300.

The display control unit 103 includes an input unit 103a, a display image generation unit 103b, a brightness detection unit 103c, a stability brightness calculation unit 103d, an LV (live view) exposure control unit 103e, an EVF backlight control unit 103f, a rear backlight control unit 103g and a low-brightness shooting determination unit 103h. The display control unit 103 is also referred to as a display control apparatus.

To the input unit 103a, an output of a captured image that is shot in the live view mode and output from the image capturing element driving IC 110 is input. The display image generation unit 103b generates display image data by processing the output of the captured image. The display image generation unit 103b executes a high-speed image process by making the process simpler than that for recording so that a motion of a subject to be displayed cannot become unnatural. The display image generation unit 103b outputs the generated display image data to the rear liquid crystal 140 and the EVF liquid crystal 301.

The brightness detection unit 103c detects the brightness of a shot subject from the captured image output input from the input unit 103a. The brightness of the subject may be obtained by averaging the brightness of the entire screen, or obtained on the basis of the brightness of the center of the screen or the brightness of a plurality of positions including the center.

The stability brightness calculation unit 103d calculates stability brightness StabBv from the brightness of the subject, which is detected by the brightness detection unit 103c. With the stability brightness StabBv, the brightness of the rear backlight 141 and the EVF backlight 302, and an exposure level by the LV exposure control unit 103e are controlled.

The brightness of the rear backlight 141 and the EVF backlight 302 are controlled so that the brightness can follow a change in the brightness of the subject. However, if the brightness of the backlight fluctuates too often, visibility can be impaired. Accordingly, the stability brightness calculation unit 103d calculates the stability brightness StabBv by modifying a change in the subject brightness so that a change in the brightness related to the display image, which is associated with a change in the brightness of the subject, cannot impair the visibility.

The LV exposure control unit 103e controls an exposure in the live view mode by setting, to a specified value, an aperture value Av, a shutter speed Tv and ISO sensitivity Sv. The LV exposure control unit 103e respectively sets the aperture value Av, the shutter speed (element shutter) Tv and the ISO sensitivity Sv on the basis of the stability brightness StabBv. The LV exposure control unit 103e outputs the set aperture value Av to the controlling CPU 101, and also outputs the set shutter speed Tv and ISO sensitivity Sv to the image capturing element driving IC 110. The LV exposure control unit 103e is also referred to as an exposure control unit.

The controlling CPU 101 controls the aperture driving mechanism 202 in accordance with the aperture value Av output from the LV exposure control unit 103e. The image capturing element driving IC 110 drives the image capturing element 111 in accordance with the shutter speed (element shutter) Tv output from the LV exposure control unit 103e. The image capturing element driving IC 110 adjusts a gain in accordance with the ISO sensitivity Sv output from the LV exposure control unit 103e.

The EVF backlight control unit 103f controls the brightness of light emitted from the EVF backlight 302 by controlling an electric current applied to the EVF backlight 302 on the basis of the stability brightness StabBv. The rear backlight control unit 103g controls the brightness of light emitted from the rear backlight 141 by controlling an electric current applied to the rear backlight 141 on the basis of the stability brightness StabBv.

Hereinafter, when there is no need to make a distinction between the EVF backlight 302 and the rear backlight 141, they are collectively referred to as a backlight. Similarly, when there is no need to make a distinction between the rear liquid crystal 140 and the EVF liquid crystal 301, they are collectively referred to as liquid crystal. Moreover, the EVF backlight control unit 103f and the rear backlight control unit 103g are collectively referred to as a display brightness control unit in some cases.

The low-brightness shooting determination unit 103h determines whether the brightness of a shot subject is equal to or lower than a specified low brightness on the basis of a brightness detected by the brightness detection unit 103c. The low brightness is, a brightness of, for example, −6EV@ISO100 (−6EV in ISO100. The same applies hereinafter). When the brightness increases in a state where the low-brightness shooting determination unit 103h determines that the brightness is equal to or lower than the specified low brightness, the stability brightness calculation unit 103d calculates stability brightness StabBv with which the backlight becomes bright more slowly than in a normal state. The reason is as follows. When the backlight is rapidly brightened in synchronization with the phenomenon of the subject rapidly becoming bright in a low-brightness state, this affects, especially, the visibility of the subject. Therefore, the calculation is performed to prevent the visibility from being affected.

FIG. 3 is a flowchart for explaining a process for controlling the brightness of the backlight with respect to a change in the brightness of the subject. The digital camera 10 is activated by turning on a power supply (step S10). The controlling CPU 101 detects that the power supply switch of the operation member 150 has been pressed, and activates the digital camera 10. The controlling CPU 101 initializes various types of setting values (step S12). An aperture, a shutter speed and the like are set to a default value.

The controlling CPU 101 starts a live view operation (step S14). When a shooting mode is selected in the digital camera 10, the controlling CPU 101 starts a live view operation. When the live view operation is started, the LV exposure control unit 103e decides default Av, Tv and Sv. Moreover, the EVF backlight control unit 103f and the rear backlight control unit 103g decide default backlight brightness.

The LV exposure control unit 103e sets (changes) a live view exposure (step S16). The live view exposure is an exposure used when a live view is displayed. Immediately after the start, the aperture 203, the shutter speed (element shutter), and the ISO sensitivity of the image capturing element driving IC 110 are respectively set to default Av, Tv and Sv. The LV exposure control unit 103e suitably changes the live view exposure in accordance with subject brightness (stability brightness StabBv) in a loop that starts at step S30 and is executed at and after a second time.

The EVF backlight control unit 103f and the rear backlight control unit 103g set (change) the brightness of the backlight (step S18). The EVF backlight control unit 103f and the rear backlight control unit 103g set the default backlight brightness decided in step S14 immediately after the start.

The brightness detection unit 103c calculates the subject brightness Bv (step S20). The brightness detection unit 103c calculates the subject brightness Bv from the captured image output that has been input to the image processing IC 102. The stability brightness calculation unit 103d calculates the stability brightness StabBv (step S22). The stability brightness calculation unit 103d calculates the stability brightness StabBv from the subject brightness Bv calculated by the brightness detection unit 103c. Details of the calculation of the stability brightness StabBv will be described with reference to FIGS. 5 and 6.

The EVF backlight control unit 103f and the rear backlight control unit 103g calculate backlight brightness and a live view exposure (step S24). The EVF backlight control unit 103f and the rear backlight control unit 103g calculate the backlight brightness on the basis of the calculated stability brightness StabBv. Moreover, the LV exposure control unit 103e calculates a live view exposure (Av', Tv', Sv') on the basis of the calculated stability brightness StabBv.

The controlling CPU 101 determines whether the release is ON (step S26). The controlling CPU 101 determines whether the release switch among the operation members 150 has been pressed. When the controlling CPU 101 determines that the release is ON ("YES" in step S26), a transition is made from the live view to still image shooting (step S28). After the still image shooting, the process proceeds to step S30.

When the controlling CPU 101 determines that the release is not ON ("NO" in step S26), it further determines whether a power supply has been turned off (step S30). When the controlling CPU 101 determines that the power supply has been turned off by using the power supply switch among the operation members 150 ("YES" in step S30), it executes the process for terminating the digital camera 10.

When the controlling CPU 101 determines that the power supply has not been turned off ("NO" in step S30), the process returns to step S16. Thus, the stability brightness StabBv for stabilizing the backlight brightness is calculated from actually detected subject brightness in the loop from step S16 to step S30, and the backlight brightness is controlled on the basis of the stability brightness StabBv.

Figure 4:
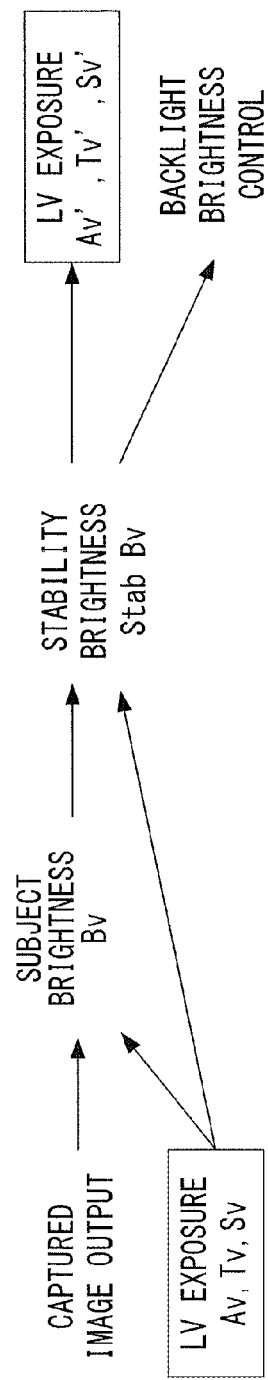
FIG. 4 illustrates the course of a process in which an LV exposure and backlight brightness control are set on the basis of an input of a captured image output.

FIG. 4 illustrates the course of a process in which the LV exposure and a backlight brightness control are set from an input of a captured image output in the display control unit 103. The LV exposure (Av, Tv, Sv) is set, and a captured image output is obtained. The brightness detection unit 103c detects the subject brightness Bv from the captured image output that has been input to the input unit 103a. The stability brightness calculation unit 103d calculates the stability brightness StabBv from the subject brightness Bv. The LV exposure control unit 103e sets a new exposure (Av', Tv', Sv') on the basis of the calculated stability brightness StabBv. Moreover, the EVF backlight control unit 103f and the rear backlight control unit 103g respectively control the brightness of the backlight on the basis of the calculated stability brightness StabBv.

Here, assuming that the amount of a change in the stability brightness StabBv until the stability brightness StabBv follows the amount of a change in the subject brightness is a brightness adjustment value AddBv obtained as follows.

$$\text{stability brightness StabBv} = (Av + Tv - Sv) = \text{AddBv}$$

Note that Bv=Av+Tv−Sv.

Figure 5:
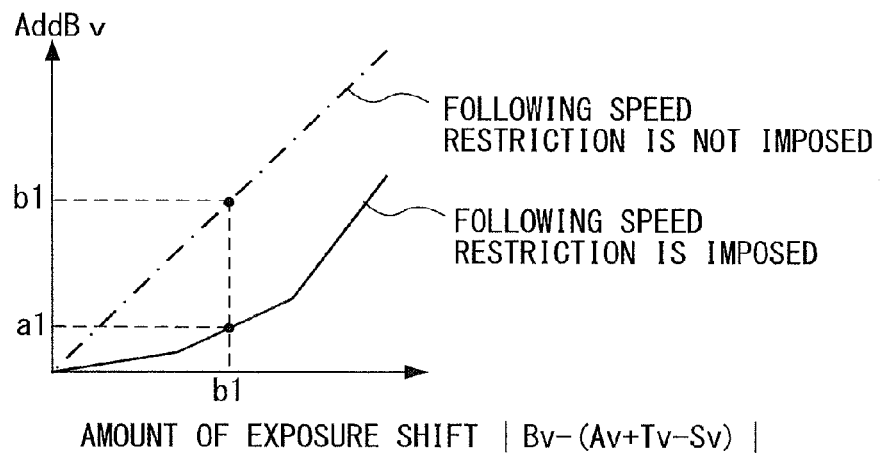
FIG. 5 is a graph for explaining a calculation of a brightness adjustment value AddBv.

FIG. 5 is a graph for explaining the calculation of the brightness adjustment value AddBv. The brightness adjustment value AddBv (vertical axis) is defined so that the brightness adjustment value AddBv can become nearly proportional to an absolute value of the amount of an exposure shift |Bv−(Av+Tv−Sv)|(horizontal axis). A polygonal line (solid line) is one example of this calculation. The brightness adjustment value AddBv is set with respect to the absolute value of the amount of an exposure shift |Bv−(Av+Tv−Sv) in accordance with a relationship indicated by a polygonal line. For example, when the exposure shift is "b1", the brightness adjustment value AddBv is set to "a1", which is smaller than b1.

Thus, the stability brightness StabBv follows an actual change in the subject brightness with a delay of a specified amount of time. For the stability brightness StabBv, a restriction is imposed on a speed at which the stability brightness StabBv follows a change in the subject brightness. Therefore, a process executed by using the stability brightness StabBv can also be referred to as "following speed restriction imposed".

In contrast, for a process executed without using the stability brightness StabBv, a restriction is not imposed on the speed at which the stability brightness StabBv follows the change in the subject brightness. Therefore, this process can also be referred to as "following speed restriction not imposed". Since the brightness adjustment value AddBv becomes equal to the absolute value of the amount of an exposure shift, the case of "following speed restriction not imposed" is a straight line (dot-dash line) of 45 degrees illustrated in FIG. 5.

Additionally, with the process executed by using the stability brightness StabBv, a gradient of the polygonal line indicated by the solid line is set to a small value in a range where the amount of the exposure shift is small, and set to a large value in a range where the amount of the exposure shift is large. Namely, the brightness adjustment value AddBv is set to a large value when the amount of the exposure shift is large, and set to a small value when the amount of the exposure shift is small. As a result, the brightness adjustment value AddBv is set so that the amount of a change can become large when the change starts (starts to follow), and can become gradually small.

Figure 6B:
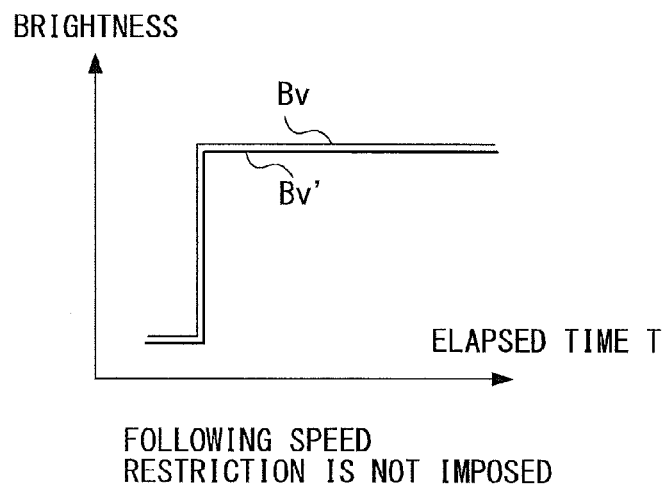
FIG. 6B represents an example of a state where stability brightness StabBv follows a change in the subject brightness Bv.

FIGS. 6A and 6B represent an example of a state where the stability brightness StabBv follows a change in the subject brightness. FIG. 6A illustrates a case where a following speed restriction is imposed, while FIG. 6B illustrates a case where a following speed restriction is not imposed (the stability brightness process is not executed).

FIG. 6A is described first. Horizontal and vertical axes respectively indicate an elapsed time T and brightness. Assume that the subject brightness Bv becomes higher (brighter) in a stepwise manner. In the meantime, the stability brightness StabBv increases in accordance with the brightness adjustment value AddBv calculated from the solid line of FIG. 5. Here, a case where the brightness adjustment value AddBv is changed in units of one frame (for example, 30 frames/sec) is described. Naturally, the brightness adjustment value AddBv may be changed not in units of one frame but in units of a plurality of frames.

Assuming that the subject brightness Bv is increased by b1 in association with FIG. 5, an exposures shift initially becomes b1, and a corresponding brightness adjustment value AddBv becomes a1. Therefore, the brightness is increased by a1 in a first frame. The exposure shift is decreased to (b1-a1) in a second frame. Therefore, the brightness is increased by the brightness adjustment value AddBv corresponding to (b1-a1) in the graph of FIG. 5. The brightness adjustment value AddBv in the second frame becomes a value smaller than a1. Then, the stability brightness StabBv catches up with the subject brightness Bv after a specified amount of time elapses (t0) while the value of the brightness adjustment value AddBv is gradually being decreased. The specified amount of time is, for example, 0.5 to 1 sec. However, the specified amount of time is not fixed, and may be varied in accordance with the amount of a change in the subject brightness.

FIG. 6B illustrates the case of "following speed restriction not imposed". Assuming that a curve when the above described process of the stability brightness StabBv is not executed is Bv', Bv' becomes almost the same curve as the changed subject brightness Bv.

Figure 7:
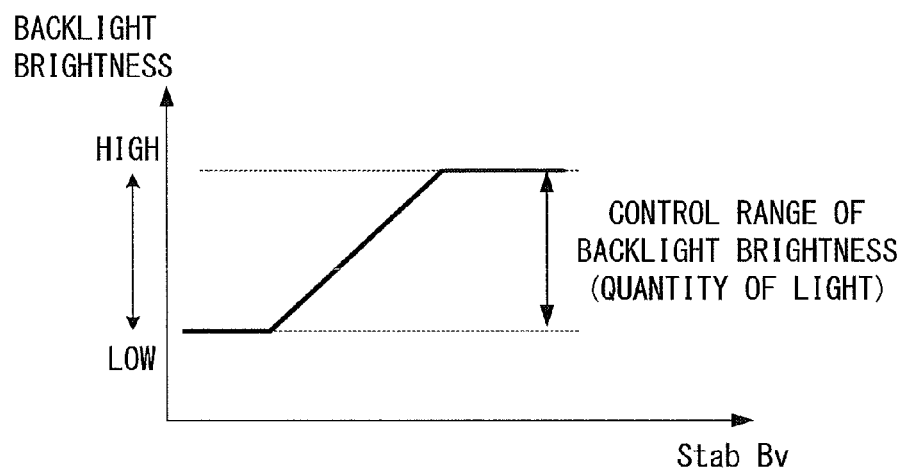
FIG. 7 is a graph that represents a range of a change in the backlight brightness with respect to the stability brightness StabBv.

FIG. 7 is a graph that represents an adjustment range of the backlight brightness with respect to the stability brightness StabBv. This is a graph that represents a value with which the backlight brightness is adjusted on the basis of the calculated stability brightness StabBv.

In a middle range of the stability brightness StabBv, the backlight brightness is changed in proportion to a change in the stability brightness StabBv. However, in ranges where the stability brightness StabBv is low and high, the backlight brightness is not changed. This is because an adjustable range of the backlight brightness is smaller than the range where the stability brightness StabBv is changed.

Figure 8A:
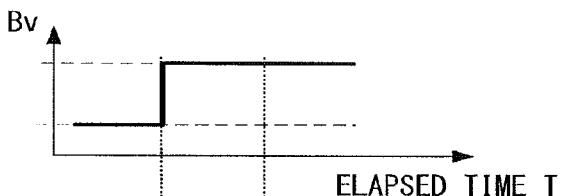
FIG. 8A illustrates a change in the backlight brightness and the like with respect to a change in the subject brightness.

FIG. 8A, 8B, 8C, 8D and 8E illustrate changes in the backlight brightness and the like with respect to a change in the subject brightness in the live view mode. FIG. 8A is a line diagram indicating a temporal change in the subject brightness Bv. Assume that the subject brightness Bv significantly changes in the form of a step similarly to the case of FIG. 6A.

Figure 8B:
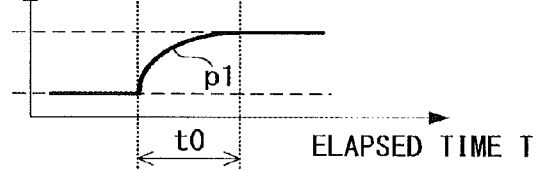
FIG. 8B illustrates a change in the backlight brightness and the like with respect to a change in the subject brightness.
Figure 8C:
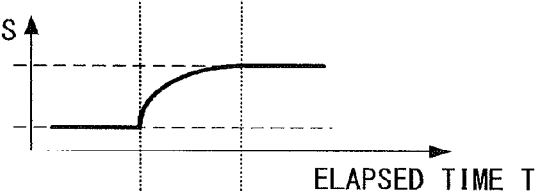
FIG. 8C illustrates a change in the backlight brightness and the like with respect to a change in the subject brightness.

The stability brightness StabBv is calculated as a curve (FIG. 8B) that slowly follows the change in the subject brightness Bv over a specified amount of time as described above with reference to FIG. 6A. The backlight brightness is controlled in accordance with the stability brightness StabBv, and becomes a curve equal to the stability brightness StabBv, and increases by a value of an increase in the subject brightness Bv after a specified amount of time elapses (FIG. 8C). Here, assume that a range of the change in the stability brightness StabBv is within the adjustable range of the backlight brightness illustrated in FIG. 7.

Figure 8D:
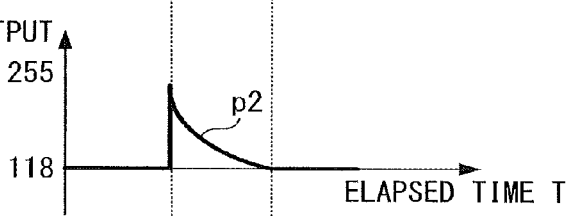
FIG. 8D illustrates a change in the backlight brightness and the like with respect to a change in the subject brightness.

A captured image output is controlled to target a reference captured image output (118) (FIG. 8D). The captured image output is image data captured by the input unit 103a. In FIG. 8D, a vertical axis of the captured image output is represented as a value equivalent to an 8-bit value, and the reference captured image output is assumed to be 118.

The captured image output is decided on the basis of the values (Av, Tv, Sv) controlled by the LV exposure control unit 103e. Then, the LV exposure control unit 103e controls the exposure so that the shape of a curve (p2) converging to the reference captured image output 118 can take a shape nearly symmetrical with a curve portion (p1) of the stability brightness StabBv with respect to a horizontal axis. Also, display data output from the image processing IC 102 to the liquid crystal becomes a curve equal to the captured image output.

The LV exposure control unit 103e controls the exposure level of the image capturing device to suit a target exposure level corresponding to the change in the subject brightness. Namely, the LV exposure control unit 103e performs a control for reducing the following speed of the exposure level as the exposure level becomes closer to the target exposure level in synchronization with the operation that the EVF backlight control unit 103f and the rear backlight control unit 103g perform to gradually decrease the amount of a change in the brightness related to a display image as time elapses while following the amount of the change. In other words, the LV exposure control unit 103e controls the exposure level so that the brightness can become a brightness that is obtained by the display brightness control unit and compensates for the brightness related to the display image, and that a temporal change in the brightness can have an equal following speed, in accordance with the calculated stability brightness StabBv.

Figure 8E:
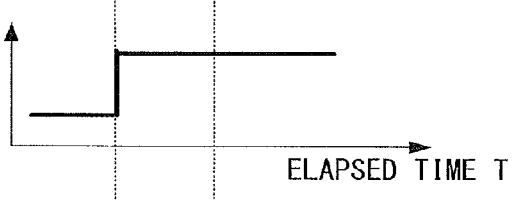
FIG. 8E illustrates a change in the backlight brightness and the like with respect to a change in the subject brightness.

The curve of FIG. 8E is a curve into which the captured image output and the backlight brightness are merged. This is equivalent to a change in the brightness that a photographer viewing the rear liquid crystal 140 or the EVF liquid crystal 301 senses. The merged curve becomes equal to the curve of the subject brightness Bv (FIG. 8A).

Figure 9A:
FIG. 9A illustrates a change in the backlight brightness and the like when the subject brightness is decreased.
Figure 9B:
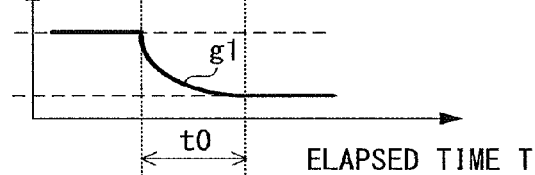
FIG. 9B illustrates a change in the backlight brightness and the like when the subject brightness is decreased.

FIG. 9A, 9B, 9C, 9D and 9E illustrate changes in the backlight brightness and the like when the subject brightness is decreased. FIG. 8A to 8E represents the example where the subject brightness significantly changes in the form of a step. In contrast, a case where the subject brightness is decreased in the form of a step is described (FIG. 9A). Also when the subject brightness is decreased, the stability brightness StabBv is calculated as a curve that slowly follows the change in the subject brightness Bv over a specified amount of time as described above with reference to FIG. 6A(FIG. 9B).

Figure 9C:
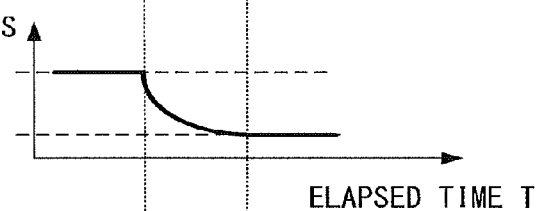
FIG. 9C illustrates a change in the backlight brightness and the like when the subject brightness is decreased.
Figure 9D:
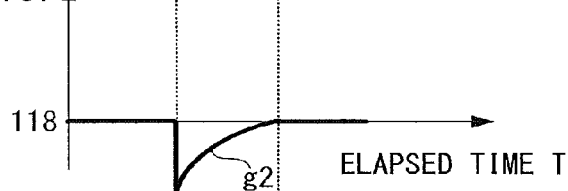
FIG. 9D illustrates a change in the backlight brightness and the like when the subject brightness is decreased.
Figure 9E:
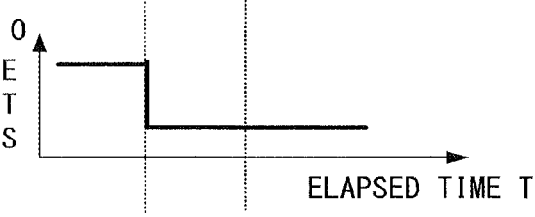
FIG. 9E illustrates a change in the backlight brightness and the like when the subject brightness is decreased.

Similarly, the backlight brightness drops as a moderate curve according to the stability brightness StabBv, and is decreased by a level of a decrease in the subject brightness Bv after a specified amount of time (t0) (FIG. 9C). Also the captured image output is restored to the reference captured image output 118 as a curve (g2) having a shape symmetrical with a curve (g1) of the stability brightness StabBv (FIG. 9D) after the captured image output drops from the reference captured image output 118. Also, the curve into which the captured image output and the backlight brightness are merged exhibits a change equal to the change in the curve (FIG. 9A) of the subject brightness Bv (FIG. 9E).

FIG. 10A, 10B, 10C, 10D and 10E illustrate changes in the backlight brightness and the like when a speed restriction is not imposed on the backlight brightness. This is a drawing for comparing the case where a speed restriction is not imposed on the backlight brightness with the case where the speed restriction is imposed as described above with reference to FIGS. 8A-8E and 9A-9E. In FIG. 10B, the stability brightness StabBv is calculated in accordance with the change in the subject brightness (FIG. 10A). Since it is assumed that the speed restriction is not imposed, the backlight brightness makes a stepwise increase similarly to the change in the subject brightness (FIG. 10C). Assume that a control corresponding to the stability brightness StabBv is performed for the captured image output similarly to the case of FIG. 8D (FIG. 10D). The curve into which the captured image output and the backlight brightness are merged becomes a curve of FIG. 10E. If the curve is like the curve of FIG. 10E, the backlight is quickly changed such that part of the subject momentarily appears across the screen, leading to a high possibility that a photographer is likely to feel the troublesomeness. For a display device as a finder, the visibility of a subject is important. However, if the backlight brightness is adjusted as indicated by the curve of FIG. 10E, the visibility of the subject can be impaired.

<Low-Brightness Shooting>

Human eyes have a nature such that a considerable amount of time is needed to adapt to brightness when it suddenly becomes bright, and this is also called light adaptation. If the brightness of the backlight rapidly increases and the entire screen becomes bright in synchronization with the phenomenon of the brightness rapidly increasing due to an entry of a bright subject onto a screen or a movement of the angle of view at the time of low-brightness shooting, the eyes cannot quickly adapt to the brighter screen, leading to a possibility such that a photographer can lose sight of the subject. Accordingly, a control is performed such that a change in the backlight brightness is more greatly delayed than in a case of normal brightness at the time of low-brightness shooting.

Figure 11:
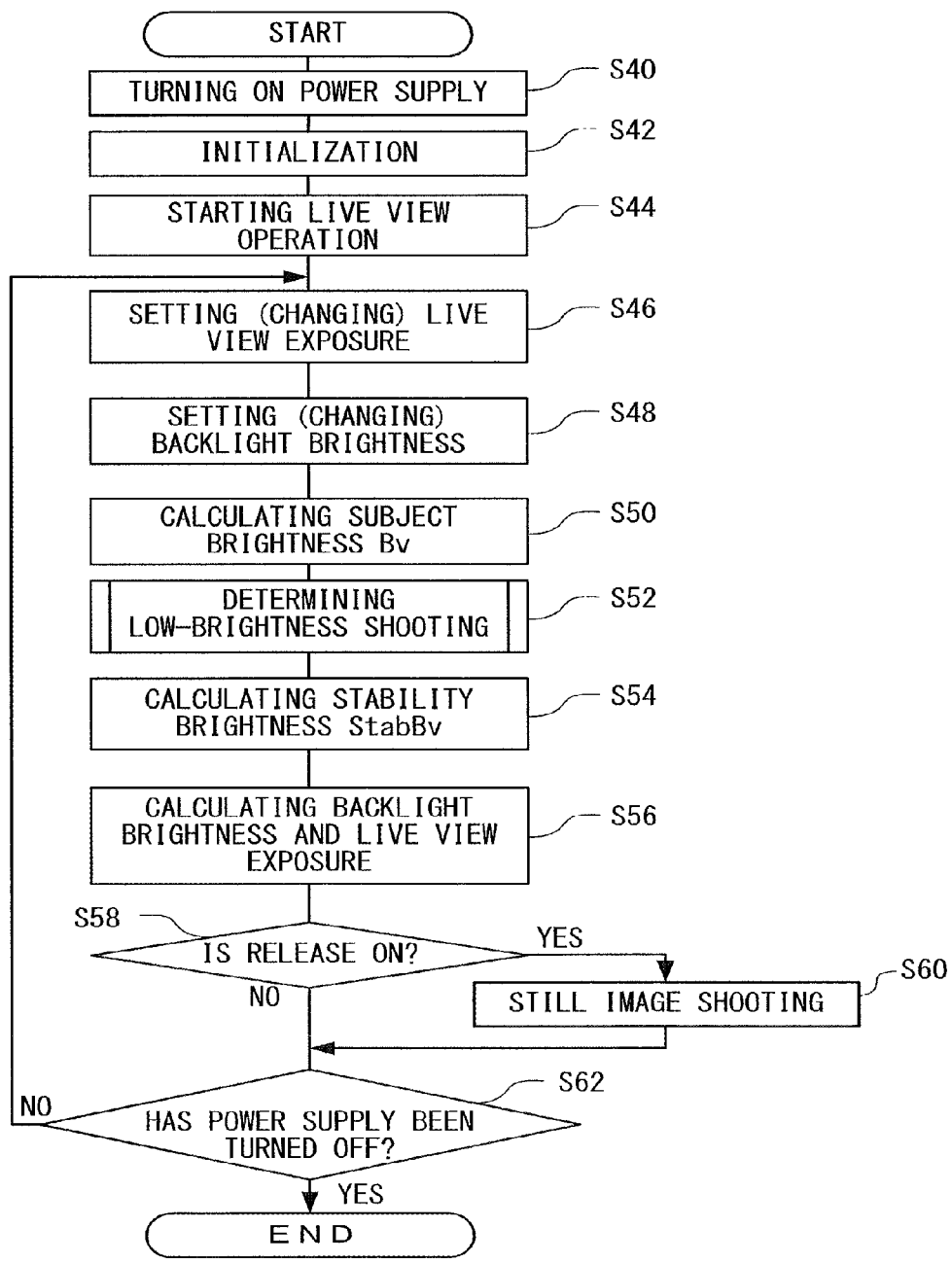
FIG. 11 is a flowchart for explaining a process for controlling the backlight brightness at the time of low brightness.

The control of the backlight brightness as the time of low-brightness shooting is described with reference to FIGS. 11 to 14E. FIG. 11 is a flowchart for explaining a process for controlling the backlight brightness at the time of low brightness. Explanations of process steps that overlap with those of FIG. 3 are simplified.

The controlling CPU 101 activates the digital camera 10 by turning on the power supply (step S40). The controlling CPU 101 initializes various types of setting values (step S42). The image processing IC 102 starts a live view operation (step S44). The LV exposure control unit 103e sets (changes) a live view exposure (step S46). The EVF backlight control unit 103f and the rear backlight control unit 103g set (change) the backlight brightness (step S48). The brightness detection unit 103c calculates the subject brightness Bv (step S50).

Figure 12:
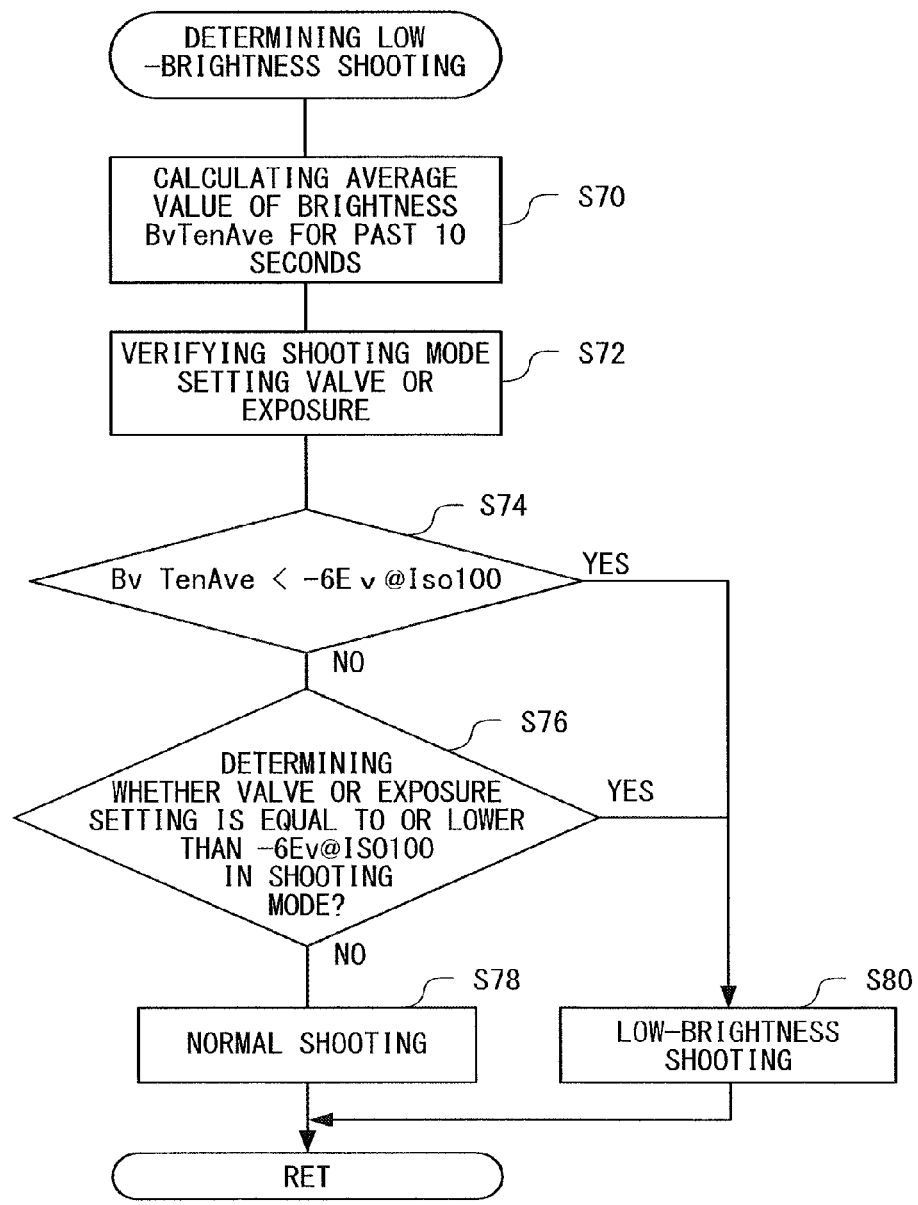
FIG. 12 is a subroutine for explaining process steps of a low-brightness shooting determination process.

Then, the low-brightness shooting determination unit 103h determines whether shooting is low-brightness shooting (step S52). FIG. 12 is a subroutine for explaining steps of a low-brightness shooting determination process. The brightness detection unit 103c calculates a brightness average value BvTenAve for a past 10 seconds (step S70). The controlling CPU 101 verifies whether the current shooting mode is either a valve or exposure setting mode (step S72).

The low-brightness shooting determination unit 103h determines whether BvTenAve is lower than −6EV@ISO100 (step S74). EV@ISO100 is a value obtained by adding 5 to a Bv value, and 0Ev@ISO100=−5Bv. Namely, 0Ev=−5Bv in the case of ISO sensitivity=100. It is empirically known that light adaptation needs more time when the brightness of the display unit (EVF) exceeds EV1 (approximately 0.2 cd/m$^2$) for a subject of Ev ranging from −6 to −10. Therefore, a threshold value of the low-brightness determination is set to −6EV@ISO100 here.

When the low-brightness shooting determination unit 103h determines that BvTenAve is lower than −6EV@ISO100 ("YES" in step S74), the low-brightness shooting is performed (step S80). When the low-brightness shooting determination unit 103h determines that BvTenAve is not lower than −6EV@ISO100 ("NO" in step S74), it further determines whether the valve or exposure setting is equal to or lower than −6EV@ISO100 in the shooting mode (step S76). When the low-brightness shooting determination unit 103h determines that the valve or the exposure setting is equal to or lower than −6EV@ISO100 in the shooting mode ("YES" in step S76), the low-brightness shooting is performed (step S80). When the low-brightness shooting determination unit 103h determines that the valve or the exposure setting is not equal to or lower than −6EV@ISO100 in the shooting mode ("NO" in step S76), it determines that the shooting is normal shooting (step S78). After step S78 or step S80, the process returns to FIG. 11.

The stability brightness calculation unit 103d calculates the stability brightness StabBv (step S54). The stability brightness calculation unit 103d calculates the stability brightness StabBv from the subject brightness Bv calculated by the brightness detection unit 103c.

Figure 13:
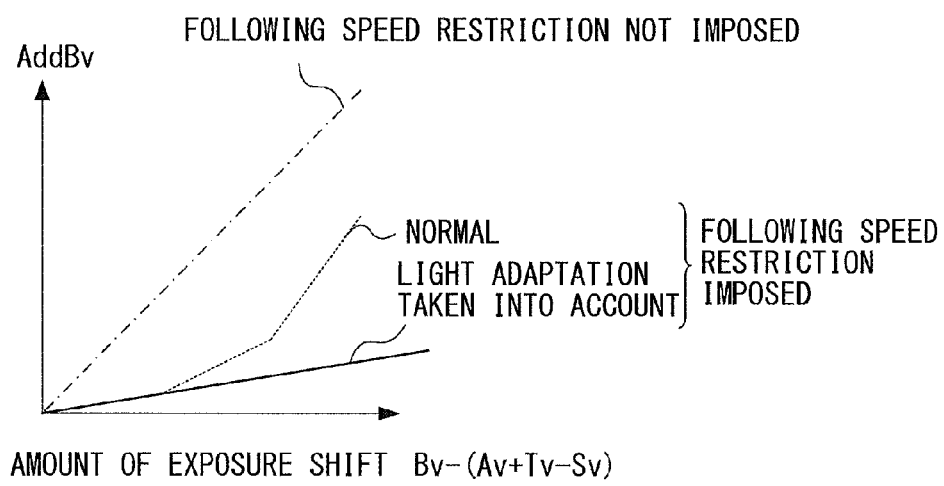
FIG. 13 is a graph for explaining a calculation of the brightness adjustment value AddBv at the time of low-brightness shooting.

FIG. 13 is a graph for explaining the calculation of the brightness adjustment value AddBv at the time of low-brightness shooting. This is a graph obtained by adding the curve of the low-brightness shooting (light adaptation is taken into account) to the graph of FIG. 5. Solid and dashed lines respectively indicate a polygonal line of the low-brightness shooting (light adaptation is taken into account) and a curve of the normal shooting. The brightness adjustment value AddBv of the low-brightness shooting (light adaptation is taken into account) is set as a curve having a smaller angle than that in the normal shooting in order to follow slower than in the case of the normal shooting. The stability brightness calculation unit 103d calculates the stability brightness StabBv by obtaining the brightness adjustment value AddBv from the amount of an exposure shift in accordance with the solid line of FIG. 13.

Returning to FIG. 11. The backlight brightness and the live view exposure are calculated (step S56). The EVF backlight control unit 103f and the rear backlight control unit 103g respectively calculate the backlight brightness on the basis of the calculated stability brightness StabBv. Moreover, the LV exposure control unit 103e calculates a live view exposure (Av', Tv', Sv') on the basis of the calculated stability brightness StabBv.

The controlling CPU 101 determines whether the release is ON (step S58). When the controlling CPU 101 determines that the release is ON ("YES" in step S58), a transition is made from the live view to still image shooting (step S60). The process proceeds to step S62 after the still image shooting.

When the controlling CPU 101 determines that the release is not ON ("NO" in step S58), it further determines whether the power supply has been turned off (step S62). When the controlling CPU 101 determines that the power supply has been turned off ("YES" in step S62), it executes a process for terminating the digital camera 10. When the controlling CPU 101 determines that the power supply has not been turned off ("NO" in step S62), the process returns to step S46.

The LV exposure control unit 103*e* changes the live view exposure on the basis of the live view exposure calculated in step S56 (step S46). Moreover, the EVF backlight control unit 103*f* and the rear backlight control unit 103*g* change the backlight brightness on the basis of the backlight brightness calculated in step S56 (step S48).

FIG. 14A, 14B, 14C, and 14D illustrate changes in the backlight brightness and the like with respect to a change in the subject brightness. Assume that the subject brightness Bv makes a stepwise increase from a low-brightness state (−9 to −6) to approximately +1 (FIG. 14A). A curve of FIG. 14B is a curve of the stability brightness StabBv calculated in association with the change in the subject brightness Bv. With the brightness adjustment value AddBv illustrated in FIG. 13, the stability brightness StabBv indicated by a solid line is calculated. A dashed line is a curve of the stability brightness StabBv in a normal case as illustrated in FIG. 8B. The curve of the low-brightness shooting follows the change in the subject brightness Bv more slowly than in the normal case with a longer time (t1 longer than t0). t1 is, for example, 0.8 to 2 sec.

A curve of FIG. 14C is a curve of the backlight brightness. The backlight brightness is a curve according to the stability brightness StabBv. Here, also assume that the range of the change in the stability brightness StabBv is within the adjustable range of the backlight brightness illustrated in FIG. 7. A curve of FIG. 14D is a curve of the captured image output. The curve of FIG. 14D is a curve having a shape symmetrical with the stability brightness StabBv. A curve into which the captured image output and the backlight brightness are merged is omitted.

As described above, the display control unit for controlling the brightness of the backlight of the rear liquid crystal 140 and the EVF liquid crystal 301 is implemented in accordance with a change in the brightness of a subject in order to prevent the visibility of the subject from being impaired.

Additionally, it has been described that the backlight control using the stability brightness StabBv is similarly performed for both the rear liquid crystal 140 and the EVF liquid crystal 301. However, the curve of the brightness adjustment value AddBv illustrated in FIG. 5 may be changed depending on whether the display is either the rear liquid crystal 140 or the EVF liquid crystal 301. Moreover, the backlight control using the stability brightness StabBv may be performed only for the EVF liquid crystal 301 that places a higher premium on the visibility. Alternatively, a change in the brightness may be made slower for the EVF liquid crystal 301 than the rear liquid crystal 140.

As a matter of course, a backlight for which the brightness is adjusted to improve the visibility of an image display is applicable to various configurations. For example, the backlight is applicable to a liquid crystal shutter having a configuration for capturing external light as a backlight, a control for adjusting the brightness of light emitted from OLED (organic EL), and the like. Moreover, the processes executed by the display control unit have been described as processes implemented by the hardware configuration using the ICs. However, some or all of the processes may be configured with software as a matter of course.

In addition, the present invention is not limited to the above-described embodiment as it is, but may be embodied by deforming constituents within a scope not deviating from the gist of the invention at an execution step. In addition, various inventions can be made by appropriately combining a plurality of constituents that have been disclosed in the above embodiment. For example, all the constituents that have been disclosed in the embodiment may be appropriately combined. Further, constituents in different embodiments may be appropriately combined. It should be understood that modifications and applications can be made without departing from the scope and the spirit of the invention.

EXPLANATION OF LETTERS OR NUMERALS

10 digital camera
100 body unit
101 controlling CPU
102 image processing IC
103 display control unit
103*a* input unit
103*b* display image generation unit
103*c* brightness detection unit
103*d* stability brightness calculation unit
103*e* LV exposure control unit
103*f* EVF backlight control unit
103*g* rear backlight control unit
103*h* low-brightness shooting determination unit
108 SDRAM
110 image capturing element driving IC
111 image capturing element
140 rear liquid crystal
141 rear backlight
150 operation member
200 lens unit
300 EVF unit
301 EVF liquid crystal
302 EVF backlight

What is claimed is:

1. A display control apparatus that controls a display image displayed on a display device, provided in an image capturing device, for visually identifying a subject, the apparatus comprising:

an input unit to which an output of a captured image obtained by shooting is input;

a brightness detection unit for detecting brightness of a shot subject on the basis of an input of the output of the captured image;

a stability brightness calculation unit for calculating stability brightness obtained by modifying a temporal change in the brightness of the subject to a slower temporal change on the basis of a change in the brightness of the subject detected by the brightness detection unit; and a display brightness control unit for controlling a following speed of a change in the brightness of the display image with respect to the change in the brightness of the subject on the basis of the calculated stability brightness so that an amount of time of the change in the brightness related to the display image becomes longer than an amount of time of the change in the brightness of the subject, wherein the display brightness control unit defines, as a brightness adjustment value, an amount of change in the stability brightness until the stability brightness catches up with the change in the brightness of the subject, and performs a control such that the stability brightness catches up with the change in the brightness of the subject while decreasing the brightness adjustment value.

2. The display control apparatus according to claim 1, wherein
the display device is a liquid crystal display device having a backlight, and
the display brightness control unit controls brightness of the backlight.

3. The display control apparatus according to claim 1, further comprising
an exposure control unit for controlling an exposure level of the image capturing device in response to the change in the brightness of the subject, wherein
the exposure control unit controls the exposure level in accordance with the calculated stability brightness so that the brightness becomes a brightness that is obtained by the display brightness control unit and compensates for the brightness related to the display image, and that a temporal change in the brightness has an equal following speed.

4. The display control apparatus according to claim 1, further comprising
a low-brightness shooting determination unit for determining whether the brightness of the shot subject is equal to or lower than specified low brightness, wherein
the display brightness control unit controls the brightness level so that the brightness related to the display device becomes a corresponding brightness with a longer time than when the brightness related to the display image is not the low brightness when the brightness of the subject increases from the low brightness determined by the low-brightness shooting determination unit.

5. The display control apparatus according to claim 1, wherein
the exposure control unit sets a brightness adjustment value until the calculated stability brightness catches up with the amount of the change in the brightness of the subject.

6. A display control method for controlling a display image displayed on a display device, provided in an image capturing device, for visually identifying a subject, the method comprising:
inputting an output of a captured image obtained by shooting;
detecting a brightness of a shot subject on the basis of an input of the output of the captured image;
calculating a stability brightness obtained by modifying a temporal change in the brightness of the subject to a slower temporal change on the basis of a change in the brightness of the subject detected by the detecting of the brightness of the subject; and
controlling a following speed of a change in the brightness of the display image with respect to the change in the brightness of the subject on the basis of the calculated stability brightness so that an amount of time of the change in the brightness related to the display image becomes longer than an amount of time of the change in the brightness of the subject, wherein
in the controlling of the following speed of the change in the brightness of the display image, an amount of change in the stability brightness until the stability brightness catches up with the change in the brightness of the subject is defined as a brightness adjustment value, and a control is performed such that the stability brightness catches up with the change in the brightness of the subject while decreasing the brightness adjustment value.

7. A computer-readable non-transitory storage medium having stored therein a program for causing a computer to execute a display control method for controlling a display image displayed on a display device, provided in an image capturing device, for visually identifying a subject, the method comprising:
inputting an output of a captured image obtained by shooting;
detecting a brightness of a shot subject on the basis of an input of the output of the captured image;
calculating a stability brightness obtained by modifying a temporal change in the brightness of the subject to a slower temporal change on the basis of a change in the brightness of the subject detected by the detecting of the brightness of the subject; and
controlling a following speed of a change in the brightness of the display image with respect to the change in the brightness of the subject on the basis of the calculated stability brightness so that an amount of time of the change in the brightness related to the display image becomes longer than an amount of time of the change in the brightness of the subject, wherein
in the controlling of the following speed of the change in the brightness of the display image, an amount of change in the stability brightness until the stability brightness catches up with the change in the brightness of the subject is defined as a brightness adjustment value, and a control is performed such that the stability brightness catches up with the change in the brightness of the subject while decreasing the brightness adjustment value.

* * * * *